United States Patent
Cho

(10) Patent No.: US 6,577,096 B2
(45) Date of Patent: Jun. 10, 2003

(54) SENSORLESS VECTOR CONTROL SYSTEM OF INDUCTION MOTOR AND METHOD THEREOF

(75) Inventor: Byung Guk Cho, Uiwang (KR)

(73) Assignee: LG Industrial Systems Co., Ltd., Seoul (KR)

(*) Notice: Subject to any disclaimer, the term of this patent is extended or adjusted under 35 U.S.C. 154(b) by 0 days.

(21) Appl. No.: 09/930,993

(22) Filed: Aug. 17, 2001

(65) Prior Publication Data

US 2002/0041171 A1 Apr. 11, 2002

(30) Foreign Application Priority Data

Aug. 18, 2000 (KR) ......................... 2000-47836

(51) Int. Cl.$^7$ .................................. H02P 1/26
(52) U.S. Cl. .................. 318/727; 318/138; 318/254; 318/799; 318/800; 318/801; 318/811
(58) Field of Search .................. 318/799, 800, 318/801, 727, 811, 138, 254

(56) References Cited

U.S. PATENT DOCUMENTS

| | | | | |
|---|---|---|---|---|
| 5,160,878 A | * | 11/1992 | Nagano | 318/800 |
| 5,481,173 A | * | 1/1996 | Yamamoto | 318/801 |
| 5,747,957 A | * | 5/1998 | Hayashida | 318/799 |
| 5,811,957 A | * | 9/1998 | Bose et al. | 318/802 |
| 5,821,727 A | * | 10/1998 | Yura | 318/809 |
| 6,014,007 A | * | 1/2000 | Seibel et al. | 318/805 |
| 6,066,934 A | * | 5/2000 | Kaitani et al. | 318/490 |
| 6,184,638 B1 | * | 2/2001 | Kinpara | 318/432 |
| 6,281,659 B1 | * | 8/2001 | Giuseppe | 318/799 |

FOREIGN PATENT DOCUMENTS

| | | | | |
|---|---|---|---|---|
| JP | 0436138 A1 | * | 5/1990 | H02P/5/40 |
| JP | 2000-270600 | * | 9/2000 | H02P/21/00 |

* cited by examiner

Primary Examiner—Robert E. Nappi
Assistant Examiner—Tyrone Smith
(74) Attorney, Agent, or Firm—Birch, Stewart, Kolasch & Birch, LLP

(57) ABSTRACT

A sensorless vector control system of an induction motor includes: a magnetic flux and speed controlling unit for receiving a predetermined command value and generating two phase voltages of DC component; a first reference frame converting unit for converting the two phase voltages of DC component into three phase voltages of AC component; an inverter for receiving the three phase voltages of AC component and driving an induction motor; a current detecting unit for receiving the three phase power of AC component flowing between the inverter and the induction motor, and detecting and outputting three phase currents of AC component; a second reference frame converting unit for receiving the three phase currents of AC component, and converting and outputting two phase currents of DC component; a magnetic flux and speed estimating unit for receiving the two phase voltage of DC component and the two phase currents of DC component, estimating a magnetic flux and speed required for a vector control; and a primary resistance estimating unit for receiving the two phase voltages of DC component, the two phase currents of DC component and the magnetic flux and speed estimated values, estimating a primary resistance and outputting it. Since the speed and the torque of the induction motor can be controlled, the vector control system can be adopted even to the application sector which requires a tension control such as paper, metal film or fiber which allows only a vector control as well as the variable speed.

22 Claims, 6 Drawing Sheets

SENSORLESS VECTOR CONTROL SYSTEM OF INDUCTION MOTOR AND METHOD THEREOF

BACKGROUND OF THE INVENTION

1. Field of the Invention

The present invention relates to a vector control system of an induction motor, and more particularly, to a sensorless vector control system of an induction motor that is capable of estimating a magnetic flux and speed of an induction motor without using a speed measuring device.

2. Description of the Background Art

In general, thanks to its easy control, a DC motor has been for a long time used for a fixed speed and variable speed control apparatus. But the DC current is has shortcomings that its use of a predetermined time consumes a brush, which, thus, requires a maintenance and repairing.

In case of an induction motor, it is superior in the aspect of maintenance and repairing thanks to its firm structure. Especially, it's low in price so that it has been widely used in the industrial field. But, the induction motor has been mainly used for a constant speed operation on account of its difficulty in controlling compared to a DC motor.

Recently, however, with the introduction of a vector control theory which is able to separately control a magnetic flux and a torque component by using a speed sensor, with the advent of a high speed power semiconductor device and with a development of a high performance microprocessor (Central Processing Unit or Digital Signal Processor), variable speed operation of the induction motor is possibly performed and the induction motor can be controlled beyond the level of the DC motor in terms of an efficiency of a speed control characteristic, so that the variable sped control field which has adopted the DC motor, growingly employs the induction motor in place of the DC motor.

In order to vector-control the induction motor, speed or magnetic flux information of the motor should be fedback from the induction motor, for which a speed information sensor or a magnetic flux sensor such as a tacho generator or a resolver or a pulse encoder is required.

However, since the sensors include an electronic circuit, the induction motor having the sensors is also restricted due to a use temperature range of the electronic circuit, and signal wiring between the speed sensor and the inverter incurs much expense.

And even though the speed sensors is possibly installed, since a coupling portion between the induction motor and the speed sensors are weak to an impact, the sensors are preferably avoided for use in terms of a facility reliability.

Thus, in order to solve such problems, researches for a sensorless vector control without a necessity of a speed sensor has been successively conducted.

Accordingly, recently, various speed estimation methods of the induction motor have been proposed with respect to the sensorless vector control without the speed sensor. Among them, researches are conducted on a method for directly estimating and controlling a magnetic flux by using a simultaneous differential equation of a model reference adaptive system (MRAS), a flux observer and a motor.

FIG. 1 is a schematic block diagram of a sensorless vector control system in accordance with a conventional art.

As shown in FIG. 1, a sensorless vector control system for receiving a power from a power supply unit 13 and driving an induction motor includes a speed controller for being fedback with a reference speed ($\omega_r^*$) and an estimation speed value ($\hat{\omega}_r$) from an integration & proportional constant computing unit 20, operating them and outputting a reference torque component current ($i_{1\beta}^*$), when the predetermined reference speed ($\omega_r^*$) and a reference magnetic flux component current ($i_{1\alpha}^*$) are given; a current to voltage command unit 10 for receiving the reference magnetic flux component current ($i_{1\alpha}^*$) and the reference torque component current ($i_{1\beta}^*$) and outputting DC reference voltages ($v_{1\alpha}^*, v_{1\beta}^*$); a DC to AC converter 11 for receiving the DC reference voltages ($v_{1\alpha}^*, v_{1\beta}^*$) and outputting two phase reference AC voltages ($v_{1d}^*, v_{1q}^*$); a phase voltage converter 12 for receiving the two phase reference AC voltages ($v_{1d}^*, v_{1q}^*$) and three phase reference phase voltages ($v_a^*, v_b^*, v_c^*$); an inverter 14 for receiving the three phase reference phase voltages ($v_a^*, v_b^*, v_c^*$) and controlling an induction motor (IM); the induction motor 15 for receiving the three phase reference phase voltages ($v_a^*, v_b^*, v_c^*$) from the inverter, to be driven; a current detector 16 for detecting a current flowing between the inverter and the induction motor and outputting detected phase currents ($i_a, i_b, i_c$); a phase current converter 17 for receiving the detected phase currents ($i_a, i_b, i_c$) and converting them into d-axis current ($i_d$) and q-axis current ($i_q$); a magnetic flux operator 18 for receiving into d-axis current ($i_d$) and q-axis current ($i_q$), receiving the two phase reference AC voltages ($v_{1d}^*, v_{1q}^*$), estimating two phase AC magnetic flux ($\hat{\lambda}_{2d}, \hat{\lambda}_{2q}$) and outputting them; an AC/DC converter 19 for receiving the estimated two phase AC magnetic flux ($\hat{\lambda}_{2d}, \hat{\lambda}_{2q}$), estimating a DC magnetic flux ($\hat{\lambda}_{2\alpha}, \hat{\lambda}_{2\beta}$) and outputting them; an integral/proportional constant computing unit 20 for estimating a speed by using $\hat{\lambda}_{2\beta}$ of the estimated DC magnetic flux components and outputting it; a slip operator 23 for receiving a magnetic flux component current ($i_{1\alpha}^*$) and a torque component current ($i_{1\beta}^*$), obtaining and outputting a slip; and an integrator 25 for receiving the slip and the estimated velocity ($\hat{\omega}_r$), and integrating them to estimate an angle.

The operation of the sensorless vector control system constructed as described above will now be explained.

First, when the integral/proportional constant computing unit 20 receives a reference speed ($\omega_r^*$) from a user, operates and outputs a value. The speed controller 22 receives the value and outputs a torque component current ($i_{1\beta}^*$).

Thereafter, the current/voltage command unit 10 outputs DC reference voltages ($v_{1\alpha}^*, v_{1\beta}^*$) by using the magnetic flux component current ($i_{1\alpha}^*$) and the torque component current ($i_{1\beta}^*$). The DC reference voltages ($v_{1\alpha}^*, v_{1\beta}^*$) are is converted into two phase AC reference voltages ($v_{1d}^*, v_{1q}^*$) by the DC to AC converter 11.

Then, in order to drive an induction motor, the phase voltage converter 12 receives the two phase AC reference voltages ($v_{1d}^*, v_{1q}^*$) and outputs three phase reference phase voltages ($v_a^*, v_b^*, v_c^*$), and the inverter 14 drives the induction motor by using power provided from a power supplier and the three phase reference phase voltages ($v_a^*, v_b^*, v_c^*$).

An estimated velocity ($\hat{\omega}_r$) and an estimated angle ($\hat{\theta}_e$), are obtained as follows.

A current flowing between the inverter 14 and the induction motor 15 is detected to obtain three phase currents ($i_a, i_b, i_c$). The three phase currents ($i_a, i_b, i_c$) are converted into two phase d-axis current ($i_d$) and q-axis current ($i_q$), which are easily controlled, and outputted by the phase current converter 17.

The magnetic flux operator 18 receives the output values ($v_{1d}^*$, $v_{1q}^*$) of the DC/AC converter 11 and the d-axis current ($i_d$) and the q-axis current ($i_q$), and estimates two phase AC magnetic flux to estimate two phase AC magnetic flux ($\hat{\lambda}_{2d}, \hat{\lambda}_{2q}$).

The AC/DC converter 19 converts the two phase AC magnetic flux ($\hat{\lambda}_{2d}, \hat{\lambda}_{2q}$) to two phase DC magnetic flux ($\hat{\lambda}_{2\alpha}, \hat{\lambda}_{2\beta}$) which can be conveniently controlled, and then the integral/proportional constant computing unit operates and obtains an estimated velocity ($\hat{\omega}_r$) by using the component $\hat{\lambda}_{2\beta}$ of the two phase DC magnetic flux components.

The estimated velocity ($\hat{\omega}_r$) and the output of the slip operator 23 are added to obtain an estimated angular velocity ($\hat{\omega}_e$) and the integrator 25 estimates an angle ($\hat{\theta}_e$) required for reference frame conversion by using the estimated angular velocity ($\hat{\omega}_e$).

The conventional sensorless vector control system described above, however, has many problems For example, first, since the current/voltage command unit does not include a differential term for the magnetic flux, only the normal state is considered, and in a transient state, it is not possible to perform an instantaneous torque controlling.

Secondly, in order to obtain the estimated velocity ($\hat{\omega}_r$), a proportional constant and an integral constant values should be accurately computed to be used by the integration & proportional constant computing unit 20, which are very difficult because the proportional constant and the integral constant values are different for every motor and they are hardly obtained substantially.

Thirdly, as described above, in case that the speed of a motor is controlled by the conventional sensorless vector control system, when it is driven with a low speed algorithm, it adopts a method in which a high frequency voltage or current is added to a primary wave voltage to search an absolute position of a magnetic flux of the motor, This method is effect at a low speed, but not possibly used at a high speed. Meanwhile, in case of the high speed algorithm, when the speed of the motor is controlled, the algorithm is effective at a high speed but its implementation is very difficult at a low speed. Consequently, it fails to cover the whole speed range.

SUMMARY OF THE INVENTION

Therefore, an object of the present invention is to provide a sensorless vector control system of an induction motor that is capable of being stably operated in an every speed range and capable of precisely controlling a speed and a torque.

Another object of the present invention is to provide a sensorless vector control system of an induction motor that is capable of automatically compensating a constant variation of a motor and a voltage error at a low speed range.

Still another object of the present invention is to provide an easily realizable algorithm by reducing a dependence on a parameter of an induction motor and an arithmetic operation without using a high performance operational unit.

To achieve these and other advantages and in accordance with the purpose of the present invention, as embodied and broadly described herein, there is provided a sensorless vector control system of an induction motor in which power is supplied from a power supply unit to drive an induction motor, including: a magnetic flux and speed controlling unit for receiving a predetermined command value and generating two phase voltages of DC component; a first coordinate converting unit for converting the two phase voltages of DC component into three phase voltages of AC component; an inverter for receiving the three phase voltages of AC component and driving an induction motor; a current detecting unit for receiving the three phase power of AC component flowing between the inverter and the induction motor, and detecting and outputting three phase currents of AC component; a second reference frame converting unit for receiving the three phase currents of AC component, and converting and outputting two phase currents of DC component; a magnetic flux and speed estimating unit for receiving the two phase voltage of DC component and the two phase currents of DC component, estimating a magnetic flux and speed required for a vector control; and a primary resistance estimating unit for receiving the two phase voltages of DC component, the two phase currents of DC component and the magnetic flux and speed estimated values, estimating a primary resistance and outputting it.

To achieve the above objects, there is further provided a sensorless vector control method of an induction motor in which power is supplied from a power supply unit to drive an induction motor, including the steps of: receiving a predetermined command value and generating two phase voltages of DC component; converting the two phase voltages of DC component into three phase voltages to drive an induction motor; detecting three phase power of AC component flowing at the induction motor when the induction motor is driven and outputting three phase currents of AC component; converting the three phase currents of AC component into two phase currents of DC component; receiving the voltages and currents of DC components and outputting a magnetic flux and speed estimated value by using an algorithm required for vector control by a magnetic flux and speed estimated values; and receiving the voltages and currents of DC component and the magnetic flux and speed estimated values and estimating a primary resistance by a primary resistance estimator.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
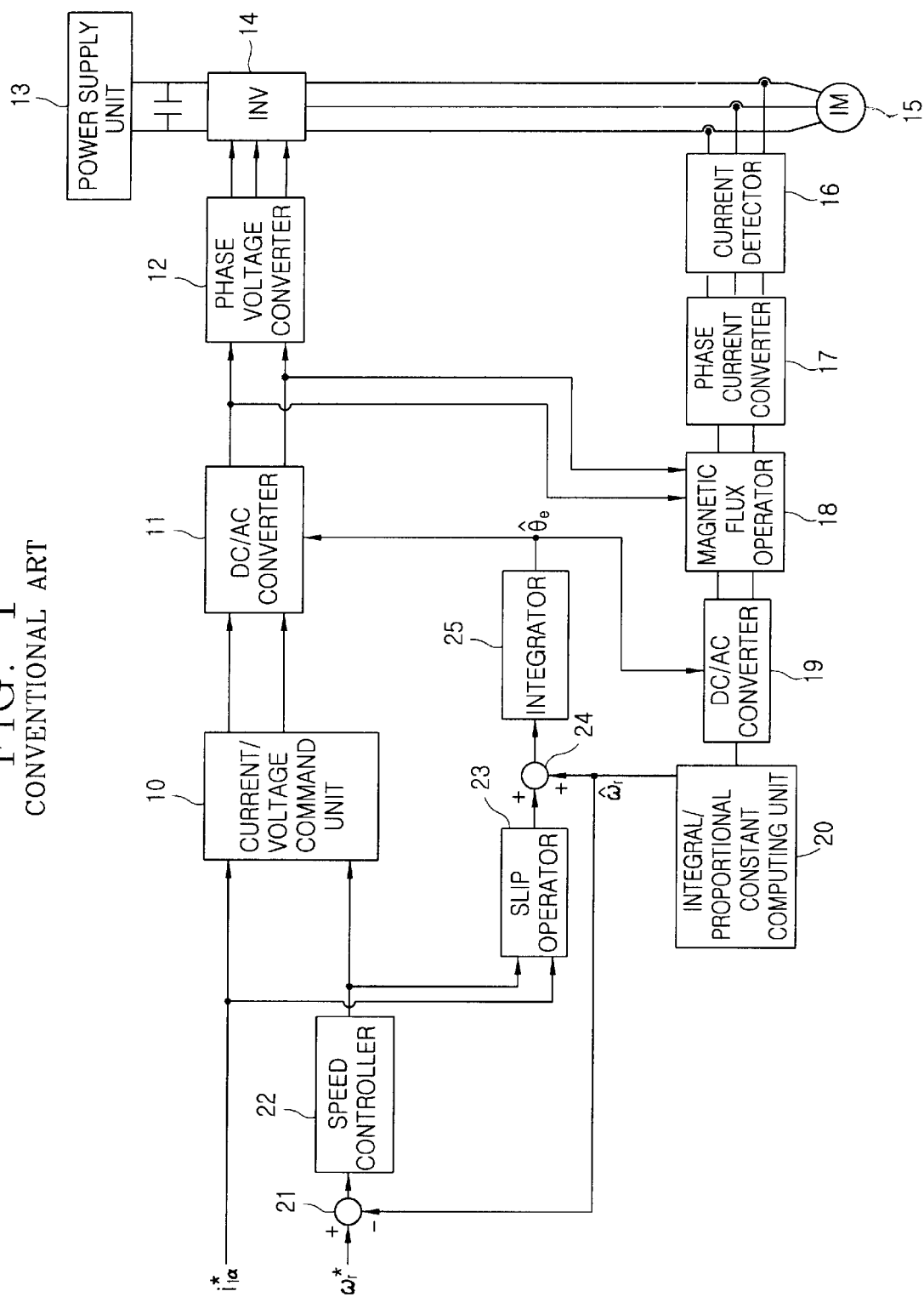
FIG. 1 is a schematic block diagram showing the construction of a general sensorless vector control system.
Figure 2:
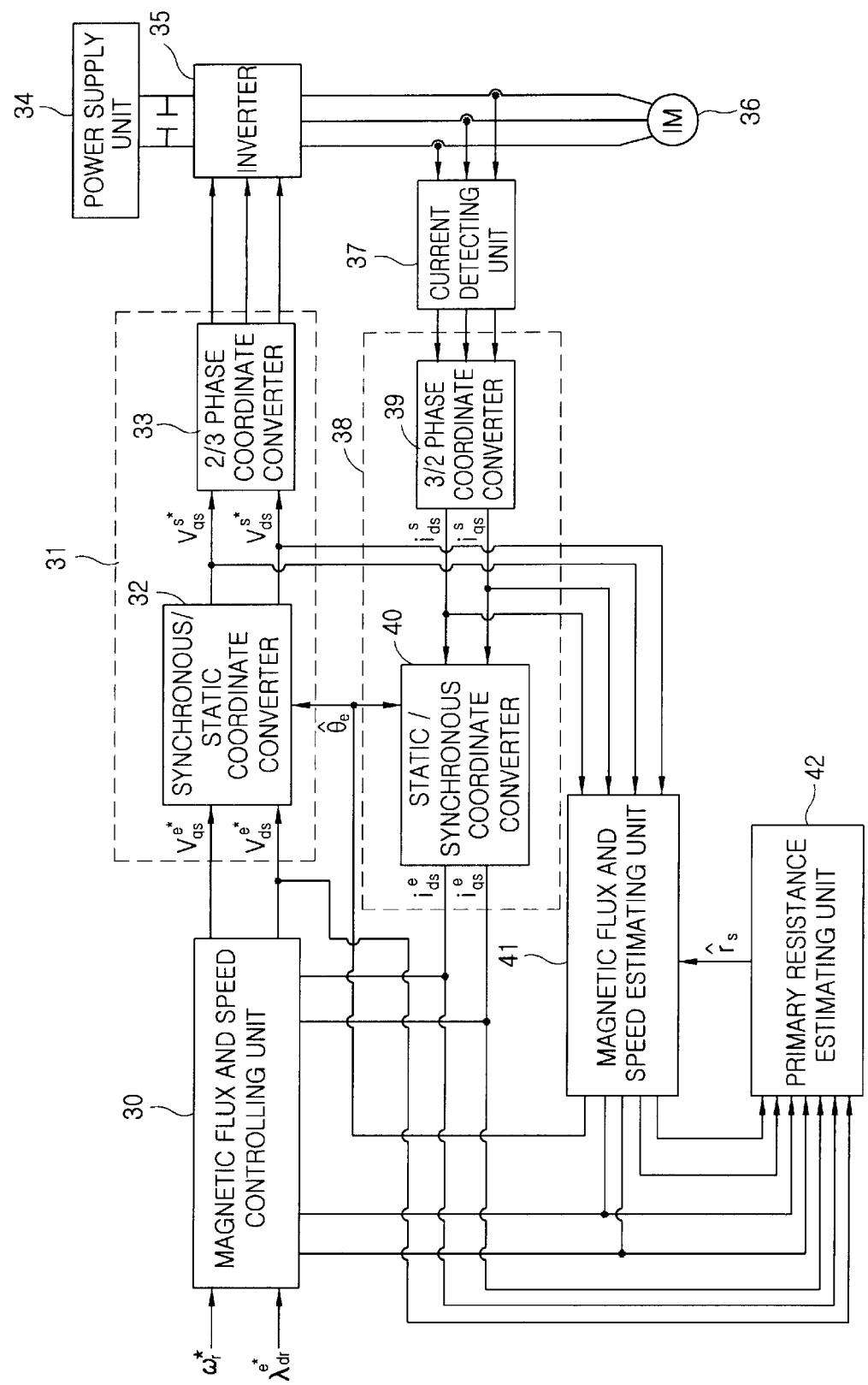
FIG. 2 is a schematic block diagram showing the construction of a sensorless vector control system of an induction motor in accordance with a preferred embodiment of the present invention.

FIG. 2 is a schematic block diagram showing the construction of a sensorless vector control system of an induction motor in accordance with a preferred embodiment of the present invention.

As shown in FIG. 2, a sensorless vector control system of an induction motor in which a power is supplied from a power supply unit 34 to drive an induction motor includes: a magnetic flux and speed controlling unit 30 for receiving a predetermined command value and generating two phase voltages of DC component; a first reference frame converting unit 31 for converting the two phase voltages of DC component into three phase voltages of AC component; an inverter 35 for receiving the three phase voltages of AC component and driving an induction motor; a current detecting unit 37 for detecting the three phase power of AC component flowing between the inverter and the induction motor, and detecting and outputting three phase currents of AC component; a second reference frame converting unit 38 for receiving the three phase currents of AC component, and converting and outputting two phase currents of DC component; a magnetic flux and speed estimating unit 41 for receiving the two phase voltage of DC component and the two phase currents of DC component, estimating a magnetic flux and speed required for a vector control; and a primary resistance estimating unit 42 for receiving the two phase voltages of DC component, the two phase currents of DC component and the magnetic flux and speed estimated values, estimating a primary resistance and outputting it.

The first reference frame converting unit 31 includes a synchronous to stationary reference frame converter 32 for receiving the two phase voltages ($v_{qs}^{e*}, v_{ds}^{e*}$) of DC component, converting them into two phase voltages ($v_{qs}^{s*}, v_{ds}^{s*}$) on a stationary reference frame and outputting them; and a 2 phase to 3 phase reference frame converter 33 for converting the two phase voltages ($v_{qs}^{s*}, v_{ds}^{s*}$) on the stationary reference frame into three phase voltages ($v_a^*, v_b^*, v_c^*$) of AC component, and outputting them.

The second reference frame converting unit 38 includes a 3 phase to 2 phase reference frame converter 39 for receiving three phase currents ($i_a, i_b, i_c$) of AC component, converting them into two phase currents ($i_{qs}^s, i_{ds}^s$), and outputting them; and a stationary to synchronous reference frame converter 40 for receiving the two phase currents ($i_{qs}^s, i_{ds}^s$) of DC component, converting them into two phase currents ($i_{ds}^e, i_{qs}^e$), and outputting them.

The operation of the sensorless vector control system of an induction motor constructed as described above will now be explained.

In a sensorless vector control method for receiving a reference from a user to control a speed of an induction motor, when a reference speed ($\omega_r^*$) is received from a user and a reference magnetic flux ($\lambda_{dr}^{e*}$) of an induction motor is received to output a q-axis voltage ($v_{qs}^{e*}$) on a synchronous coordinate system and a d-axis voltage ($v_{ds}^{e*}$) on the synchronous reference frame.

The q-axis voltage ($v_{qs}^{e*}$) and the d-axis voltage ($v_{ds}^{e*}$) on the synchronous reference frame are converted into two phase voltages ($v_{qs}^{s*}, v_{ds}^{s*}$) on the stationary reference frame used as an input power source of the magnetic flux and speed estimating unit 41, and in order to drive the induction motor 36, the two phase voltages ($v_{qs}^{s*}, v_{ds}^{s*}$) on the coordinated system is converted into three phase voltages ($v_a^*, v_b^*, v_c^*$).

Thereafter, the inverter 35 receives the three phase voltages ($v_a^*, v_v^*, v_c^*$) along with a DC link detect voltage ($v_{dc}$) provided from a power supplier, and drives the induction motor 36 according to its switching control.

At this time, when the induction motor 36 is driven, three phase currents ($i_a, i_b, i_c$) flowing between the inverter 36 and the induction motor 35 are detected, the detected three phase currents ($i_a, i_b, i_c$) are converted into two phase currents on the static coordinate system, which are supplied as an input current to the magnetic flux and speed estimating unit 39, and the two phase currents ($i_{qs}^s, i_{ds}^s$) on the static coordinate system into two phase currents ($i_{ds}^e, i_{qs}^e$) on the synchronous reference frame.

Accordingly, the magnetic flux and speed estimator 39 receives the voltages ($v_{qs}^{s*}, v_{ds}^{s*}$) on the stationary reference frame and the currents ($i_{qs}^s, i_{ds}^s$) on the stationary reference frame, and estimates and outputs a d axis DC magnetic flux ($\hat{\lambda}_{dr}^e$), a q axis DC magnetic flux ($\hat{\lambda}_{qr}^e$), a magnetic angle ($\hat{\theta}_e$), a magnetic flux angular velocity ($\hat{\omega}_e$) and an estimated velocity ($\hat{\omega}_r$).

The primary resistance estimating unit 42 receives the two phase currents ($i_{ds}^e, i_{qs}^e$) on the synchronous reference frame, the d-axis voltage ($v_{ds}^{e*}$) on the synchronous reference frame and the output values ($\hat{\omega}_e, \hat{\omega}_r, \hat{\lambda}_{dr}^e, \hat{\lambda}_{qr}^e$) of the magnetic flux and speed estimating unit 41, estimates a primary resistance ($\hat{R}_s$) and outputs it to the magnetic flux and speed estimating unit 41, so that the induction motor can be constantly controlled by the vector control system without necessity of a speed sensor.

Figure 3:
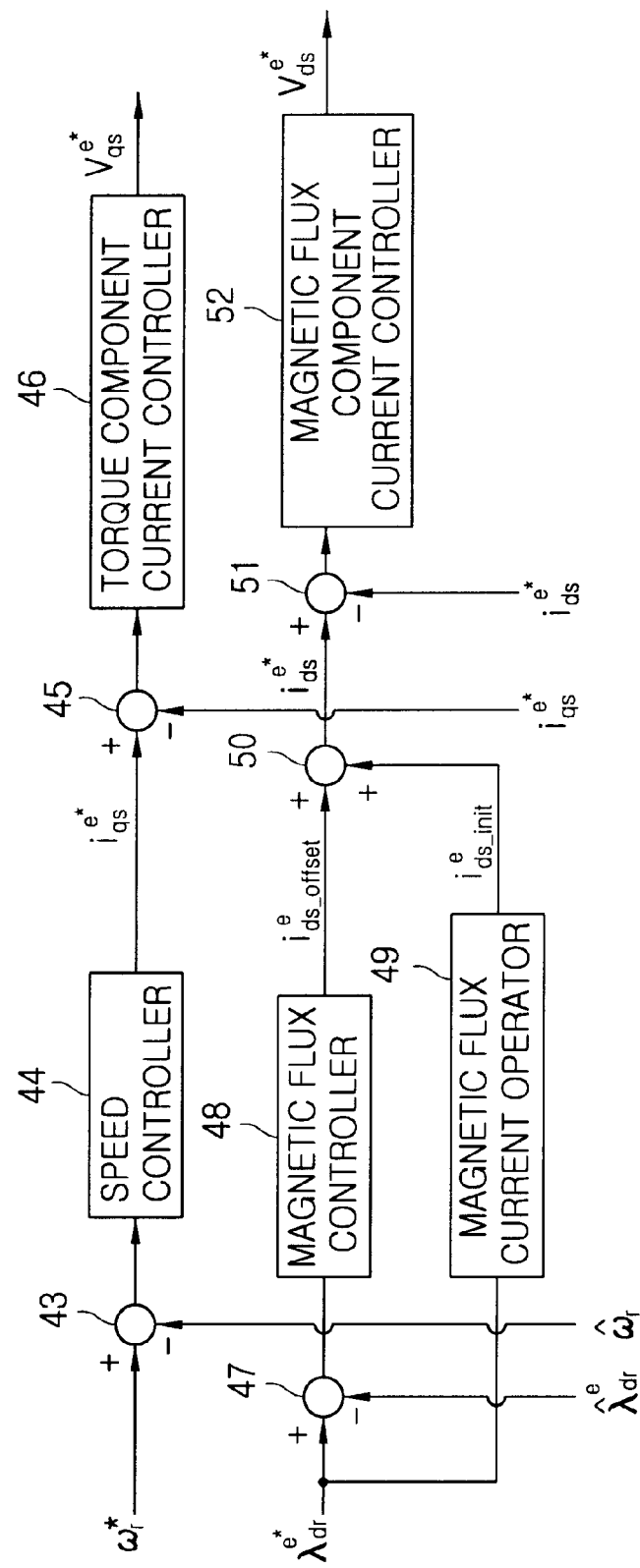
FIG. 3 is a view showing the construction of a magnetic flux and speed controlling unit of the sensorless vector control system of an induction motor in accordance with the preferred embodiment of the present invention.

FIG. 3 is a view showing the construction of a magnetic flux and speed controlling unit of the sensorless vector control system of an induction motor in accordance with the preferred embodiment of the present invention.

As shown in FIG. 3, the magnetic flux and speed controlling unit includes: a first operator 43 for receiving the reference velocity ($\omega_r^*$) and the estimated velocity ($\hat{\omega}_r$) and arithmetically operating them; a speed controller 44 for receiving the output of the first operator and outputting a reference torque component current ($i_{qs}^{e*}$); a second operator for receiving the reference torque component current ($i_{qs}^{e*}$) and the torque component current ($i_{qs}^e$) on the coordinate system, and arithmetically operating them; a torque component current controller 46 for receiving the output of the second operator and generating a q-axis voltage ($v_{qs}^{e*}$) on the synchronous reference frame; a third operator 47 for receiving the reference magnetic flux ($\lambda_{dr}^{e*}$) and the estimated magnetic flux ($\hat{\lambda}_{dr}^e$) of the induction motor, and arithmetically operating them; a magnetic flux controller 48 for receiving the output of the third operator and outputting an magnetic flux component offset current ($i_{ds\_offset}^{e*}$); a magnetic flux current operator 49 for receiving the reference magnetic flux ($\lambda_{dr}^{e*}$) of the induction motor and outputting an initial magnetic flux component current ($i_{ds_{init}}^{e*}$); a fourth operator 50 for receiving the magnetic flux component offset current ($i_{ds_{init}}^{e*}$) and the initial magnetic flux component current ($i_{ds_{init}}^{e*}$) and operating them; a fifth operator 51 for receiving the output value ($i_{ds}^{e*}$) of the fourth operator 48 and the magnetic flux component current ($i_{ds}^e$) on the synchronous reference frame; and a magnetic flux component current controller 52 for receiving the output of the fifth operator and generating a d-axis voltage ($v_{ds}^{e*}$) on the synchronous reference frame.

The operation of the magnetic flux and speed controlling unit of the sensorless vector control system of an induction motor constructed as described above will now be explained.

First, in order to generate a q-axis voltage ($v_{qs}^{e*}$) on the synchronous reference frame by using the reference velocity ($\omega_r^*$), a torque component current needs to be controlled.

Accordingly, the reference velocity ($\omega_r^*$) and the estimated velocity ($\hat{\omega}_r$) are received from the user, and the operational value is outputted. And then, upon receipt of the output, the speed controller outputs a reference torque component current ($i_{qs}^{e*}$) At this time, when the torque current controller 44 receives a difference value between the reference torque component current ($i_{qs}^{e*}$) and the torque component current ($i_{qs}^e$) on the synchronous coordinate system, the q-axis voltage ($v_{qs}^{e*}$) on the synchronous reference frame can be generated.

In addition, in order to generate a d-axis voltage ($v_{ds}^{e*}$) on the synchronous reference frame by using the reference magnetic flux ($\lambda_{dr}^{e*}$), the magnetic flux component current needs to be controlled.

Accordingly, a difference value between the reference magnetic flux ($\lambda_{dr}^{e*}$) and the estimated magnetic flux ($\hat{\lambda}_{dr}^e$) of the induction motor is outputted, the magnetic flux component offset current ($i_{ds\_offset}^{e*}$) is outputted.

At this time, the magnetic flux current operator 49 receives the reference magnetic flux ($\lambda_{dr}^{e*}$) of the induction motor and outputs the initial magnetic flux component current ($i_{ds\_init}^{e*}$).

Accordingly, the output value ($i_{ds}^{e*}$) of the fourth operator can be obtained by using the magnetic flux component offset current ($i_{ds\_offset}^{e*}$) and the initial magnetic flux component current ($i_{ds\_init}^{e*}$). At this time, the magnetic flux component current controller 52 can generate the d-axis voltage ($v_{ds}^{e*}$) on the synchronous reference frame by using the difference value between the output value ($i_{ds}^{e*}$) of the fourth operator and the actual magnetic flux component current ($i_{ds}^e$).

Figure 4:
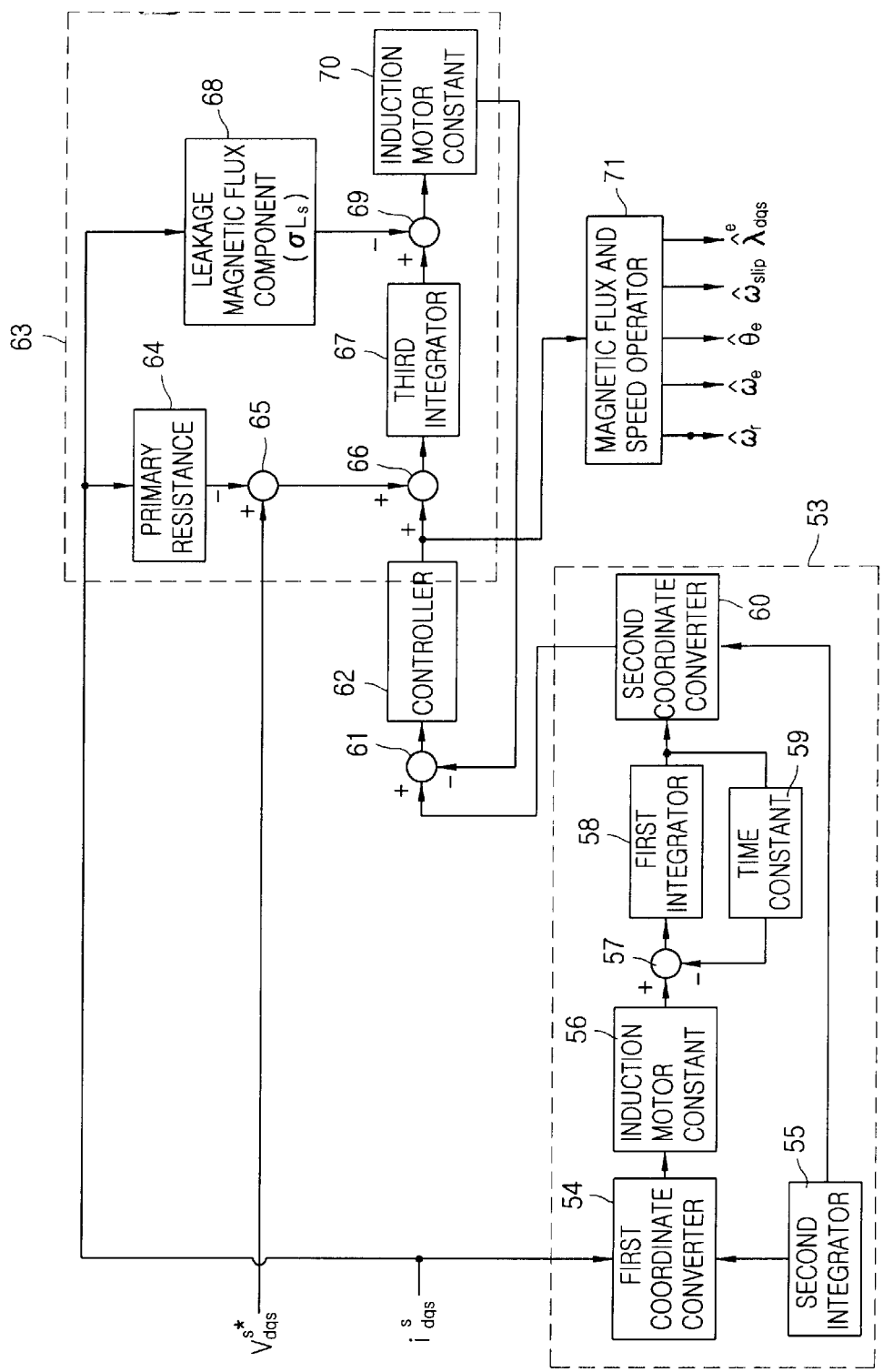
FIG. 4 is a view showing the construction of a magnetic flux and speed estimating unit of the sensorless vector control system of an induction motor in accordance with the preferred embodiment of the present invention.

FIG. 4 is a view showing the construction of a magnetic flux and speed estimating unit of the sensorless vector control system of an induction motor in accordance with the preferred embodiment of the present invention.

As shown in FIG. 4, the magnetic flux and speed estimating unit includes: a rotor magnetic flux estimator 53 according to a current model having a first coordinate converter 54 for receiving the two phase currents ($e_{dqs}^s; i_{ds}^s, i_{qs}^s$) values expressed in the stationary reference frame and converting them into the synchronous reference frame values and outputting them; a sixth operator 57 for outputting a difference between a value obtained by multiplying the output values ($i_{dqs}^r; i_{ds}^r, i_{qs}^r$) of the first coordinate converter 54 by an induction motor constant $$\left(\frac{L_m}{L_r}\right)$$

56 and a value obtained by multiplying rotor magnetic flux ($\hat{\lambda}_{dqr}^r; \hat{\lambda}_{dr}^r \hat{\lambda}_{qr}^r$) on the synchronous reference frame by a time constant $$\left(\frac{1}{T_r}\right)$$

59 defined by the induction motor constant; a first integrator 58 for receiving the output value of the sixth operator 47 and outputting a rotor magnetic flux ($\hat{\lambda}_{dqr}^r$) on the synchronous reference frame; a second integrator 55 for receiving an estimated velocity ($\hat{\omega}_r$) from a magnetic flux and speed operator 71 (to be described) and integrating it; and a second coordinate converter 60 for receiving the output value ($\hat{\lambda}_{dqr}^r$) of the first integrator 59 and the output value of the second integrator 44, reference frame—converting them, and outputting a rotor magnetic flux ($\hat{\lambda}_{dqr\_cm}^s$) on the stationary reference frame; a rotor magnetic flux estimating unit 63 having an eighth operator 65 for operating a value of an actual current ($i_{dqs}^s$) obtained by multiplying computed value voltages ($v_{dqs}^{s*}; v_{ds}^{s*}, v_{qs}^{s*}$) of the stationary reference frame converter and the primary resistance 64 together and outputting it; a ninth operator 66 for operating the output value of the eight operator 65 and the output value of a controller 62 (to be described) and outputting it, a third integrator 67 for integrating the output value of the ninth operator 66, a tenth operator 69 for operating a difference value between a value obtained by multiplying the actual current ($i_{dqs}^s$) by a leakage magnetic flux component ($\sigma L_s$) 68 and the output value of the third integrator 57, and an induction motor constant $$\left(\frac{L_m}{L_r}\right)$$

70; a seventh operator 61 for operating the value ($\hat{\lambda}_{dqr\_vm}^s$) outputted after multiplying the output value of the tenth operator 69 by the induction motor constant $$\left(\frac{L_m}{T_r}\right)$$

70 and the output value ($\hat{\lambda}_{dqr\_cm}^s$) of the second stationary reference frame converter; a controller 62 for receiving the output value of the seventh operator 61, operating it as a proportional constant and outputting rotor magnetic flux estimating values ($\hat{\lambda}_{dqr}^s; \hat{\lambda}_{dr}^s \hat{\lambda}_{qr}^s$); and a magnetic flux and speed operator 69 for receiving the magnetic flux estimated value ($\hat{\lambda}_{dqr}^s$) and operating a value required for vector control.

The operation of the magnetic flux and speed estimating unit of the sensorless vector control system of an induction motor constructed as described above will now be explained.

The operation for magnetic flux and speed estimation is made by using a CPU (Central Processing Unit) or a DSP (Digital Signal Processor).

The magnetic flux and speed estimating unit of the present invention without using a speed sensor estimates a rotor magnetic flux ($\hat{\lambda}_{dqr\_cm}^s$) according to a current model and a rotor magnetic flux ($\hat{\lambda}_{dqr\_vm}^s$) according to a voltage model by using the current and voltage expressed in a stationary reference frame, obtains the difference value between the voltage model estimated value and the current model estimated value, multiplies the difference value by the proportional constant value in proportion to the speed of the induction motor, thereby obtaining the magnetic flux estimated value ($\hat{\lambda}_{dqr}^s$). Accordingly, values ($\hat{\theta}_e, \hat{\omega}_e, \hat{\omega}_r, \hat{\lambda}_{dr}^e, \hat{\lambda}_{qr}^e, \hat{\omega}_{slip}$) required for vector control can be obtained by using the magnetic flux estimated value ($\hat{\lambda}_{dqr}^s$).

First, the operation of the rotor magnetic flux estimator 53 according to the current model will now be described.

The first coordinate converter 54 receives the actual current ($i_{dqs}^s$) on the stationary reference frame and the output value of the second integrator 55, converts them into a current of the synchronous reference frame and outputs it.

Accordingly, the sixth operator 56 receives the value obtained by multiplying the output value ($i_{dqs}^r$) by the induction motor constant $$\left(\frac{L_m}{L_r}\right)$$

and simultaneously receives the value obtained by multiplying the rotor magnetic flux ($\hat{\lambda}_{dqr}^r$) on the synchronous reference frame by the time constant $$\left(\frac{1}{T_r}\right)$$

59 defined as the induction motor constant, computes the difference and outputs it.

Thereafter, the first integrator 58 receives the output value of the sixth operator 55 and outputs the rotor magnetic flux ($\hat{\lambda}_{dqr}^r$) on the synchronous coordinate system. Accordingly, the second reference frame converter 60 receives the output value ($\hat{\lambda}_{dqr}^r$) of the first integrator 58 and the output value of the second integrator 55, coordinate-converts them, and outputs a rotor magnetic flux ($\hat{\lambda}_{dqr\_cm}^s$) according to the current model.

The rotor magnetic flux ($\hat{\lambda}_{dqr}^r$) on the synchronous reference frame according to the magnetic flux estimating method is obtained as follows.

$$\frac{d\hat{\lambda}_{dr}^r}{dt} = -\frac{r_r}{L_r}\hat{\lambda}_{dr}^r + r_r\frac{L_m}{L_r}i_{ds}^r \tag{1}$$

$$\frac{d\hat{\lambda}_{qr}^r}{dt} = -\frac{r_r}{L_r}\hat{\lambda}_{qr}^r + r_r\frac{L_m}{L_r}i_{qs}^r \tag{2}$$

wherein '$L_r$' indicates a synchronous reactance, '$L_m$' indicates a magnetized reactance, '$r_r$' indicates a resistance of synchronization side, and '$i_{ds}^r$' and '$i_{qs}^r$' indicate current on the synchronous reference frame.

Equations (1) and (2) are made to obtain the rotor magnetic flux on the synchronous reference frame, which may be expressed to the rotor magnetic flux ($\hat{\lambda}_{dr}^s, \hat{\lambda}_{qr}^s$) on the static coordinate system as follows:

$$\hat{\lambda}_{dr}^s = \hat{\lambda}_{dr}^r \cos\theta_r - \hat{\lambda}_{qr}^r \sin\theta_r \tag{3}$$

$$\hat{\lambda}_{qr}^s = \hat{\lambda}_{dr}^r \sin\theta_r + \hat{\lambda}_{qr}^r \cos\theta_r \tag{4}$$

The operation of the rotor magnetic flux estimating unit according to the voltage model will now be described.

The eighth operator 65 computes an actual current value ($i_{dqs}^s$) obtained by multiplying the computation value voltage ($v_{dqs}^{s*}$) of the stationary reference frame converter and the primary resistance 64 together.

The ninth operator 66 receives the output value of the eighth operator 63 and the output value of the controller 62, computes and outputs them.

The third integrator 67 integrates the output value of the ninth operator 66.

Thereafter, the tenth operator 69 receives the value obtained by multiplying the actual current ($i_{dqs}^s$) by the leakage magnetic flux component ($\sigma L_s$) 68 and computes a difference value.

Accordingly, a rotor magnetic flux ($\hat{\lambda}_{dqr\_vm}^s$) according to the voltage model can be obtained by multiplying the output value of the tenth operator 69 by the induction motor constant $$\left(\frac{L_m}{T_r}\right)$$

70.

The rotor magnetic flux ($\hat{\lambda}_{dr}^s, \hat{\lambda}_{qr}^s$) on the static coordinate system according to the magnetic flux estimating method can be obtained by the following equations $$\hat{\lambda}_{ds}^s = \int (V_{ds}^s - r_s i_{ds}^s) dt \tag{5}$$

$$\hat{\lambda}_{qs}^s = \int (V_{qs}^s - r_s i_{qs}^s) dt \tag{6}$$

wherein '$v_{ds}^s$' and '$v_{qs}^s$' indicate voltage on the stationary reference frame, '$i_{qs}^s$' and '$i_{ds}^s$' indicate currents on the stationary reference frame, and '$r_s$' indicates a primary resistance.

In equations (5) and (6), the following rotor magnetic flux ($\hat{\lambda}_{dr}^s, \hat{\lambda}_{qr}^s$) can be obtained in consideration of the stator leakage magnetic flux component ($\sigma L_s$).

$$\hat{\lambda}_{dr}^s = \frac{L_r}{L_m}(\hat{\lambda}_{ds}^s - \sigma L_s i_{ds}^s) \tag{7}$$

$$\hat{\lambda}_{qr}^s = \frac{L_r}{L_m}(\hat{\lambda}_{qs}^s - \sigma L_s i_{qs}^s) \tag{8}$$

wherein '$L_r$' indicates a synchronous reactance, '$L_m$' indicates a magnetized reactance, and '$i_{qs}^s$' and '$i_{ds}^s$' indicate currents on the stationary reference frame.

Accordingly, the rotor magnetic flux estimating method using the current model is used in a low speed range along with a low pass filter in order to prevent generation of a magnetic flux estimation error according to the motor constant variation, and the rotor magnetic flux estimating method using the voltage model is used in a high speed range together with a high pass filter in order to remove problems such as a variation offset, an integrator saturation, a stator impedance drop at a low speed and a magnetic estimation error due to a noise.

In addition, since the current model and the voltage model use an integral function and a differential function, the instantaneous torque, the strong point of the vector control, can be controlled. And the value used for the controller is a constant value proportional to the induction motor speed, so that it can be easily determined in the velocity range.

Following equation (9) can be obtained by adopting a suitable filter to the voltage model and the current model.

$$\hat{\lambda}_{dqr}^s = \frac{s}{s+K_p}\hat{\lambda}_{dqr\_vm}^s + \frac{K_p}{s+K_p}\hat{\lambda}_{dqr\_cm}^s \tag{9}$$

In this case, the magnetic flux estimated value ($\hat{\lambda}_{dqr}^s$) required for the vector control signifies a magnetic flux estimated by using the rotor magnetic flux ($\hat{\lambda}_{dqr\_cm}^s$) according to the current model and the rotor magnetic flux ($\hat{\lambda}_{dqr\_vm}^s$) according to the voltage model. The voltage model uses the high pass filter $$\left(\frac{s}{s+K_p}\right)$$

and the current model uses the low pass filter $$\left(\frac{K_p}{s+K_p}\right),$$

to estimate the final rotor magnetic flux.

Figure 5:
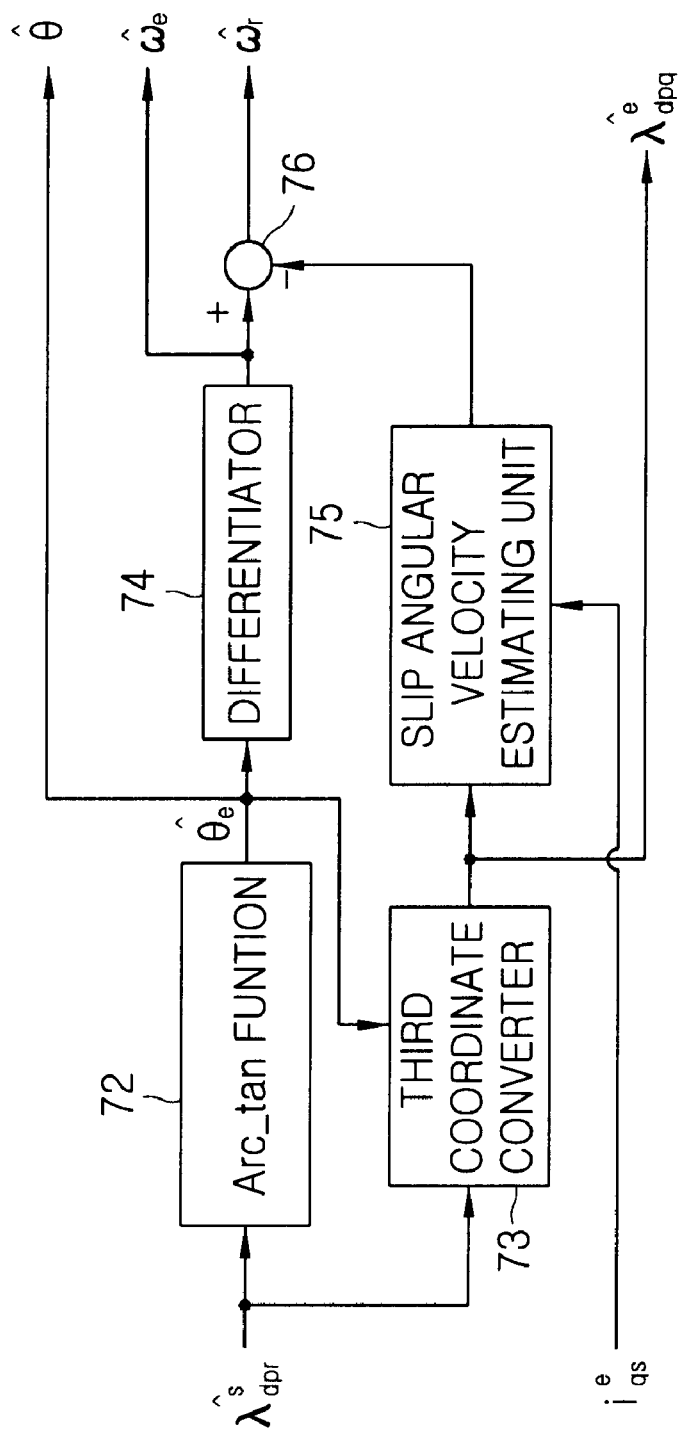
FIG. 5 is a view showing the construction of a magnetic flux and speed operational unit of the sensorless vector control system of an induction motor in accordance with the preferred embodiment of the present invention.

FIG. 5 is a view showing the construction of the magnetic flux and speed operational unit of the sensorless vector control system of an induction motor in accordance with the preferred embodiment of the present invention.

As shown in FIG. 5, the magnetic flux and speed operational unit of the sensorless vector control system of the induction motor includes an Arc_tan( ) function 72 for receiving a magnetic flux estimated value ($\hat{\lambda}_{dqr}^s$) and estimating a magnetic flux angle ($\hat{\theta}_e$); a differentiator 74 for receiving the estimated magnetic flux angle and estimating a magnetic flux angular velocity ($\hat{\omega}_e$); a third reference frame converter 73 for receiving the magnetic flux estimated value ($\hat{\lambda}_{dqr}^s$) and the magnetic flux angle ($\hat{\theta}_e$) and outputting a DC magnetic flux ($\hat{\lambda}_{dqr}^e$) on the synchronous reference frame; a slip angular velocity estimating unit 75 for receiving the output value of the third reference frame converter and a current ($i_{qs}^e$) on the synchronous reference frame and estimating a slip angular velocity ($\hat{\omega}_{slip}$); and an eleventh operator 76 for operating the output value ($\hat{\omega}_e$) of the differentiator and the estimated slip angular velocity ($\hat{\omega}_{slip}$) and outputting an estimated velocity ($\hat{\omega}_r$).

The operation of the magnetic flux and speed operational unit of the sensorless vector control system of an induction motor constructed as described above will now be explained.

First, the magnetic flux angular ($\hat{\theta}_e$) is estimated by using the magnetic flux estimated value ($\hat{\lambda}_{dqr}^s$) obtained from the voltage model and the current model and the Arc_tan( ) function 72, and the estimated magnetic flux angle ($\hat{\theta}_e$) is received to estimate the magnetic flux angular velocity ($\hat{\omega}_e$) by using the differentiator 74.

At this time, the third coordinate converter 73 receives the magnetic flux estimated value ($\hat{\lambda}_{dqr}^s$) and the magnetic flux angle ($\hat{\theta}_e$) and outputs the DC magnetic flux ($\hat{\lambda}_{dqr}^e$) on the synchronous reference frame, and the slip angular velocity estimating unit 75 receives the d axis magnetic flux value ($\hat{\lambda}_{dr}^e$) of the output value ($\hat{\lambda}_{dqr}^e$) of the third reference frame converter and the current ($i_{qs}^e$) on the synchronous reference frame, and estimates the slip angular velocity ($\hat{\omega}_{slip}$). Accordingly, the estimated velocity ($\hat{\omega}_r$) can be obtained by operating the output value ($\hat{\omega}_e$) of the differentiator and the estimated slip angular velocity ($\hat{\omega}_{slip}$).

Figure 6:
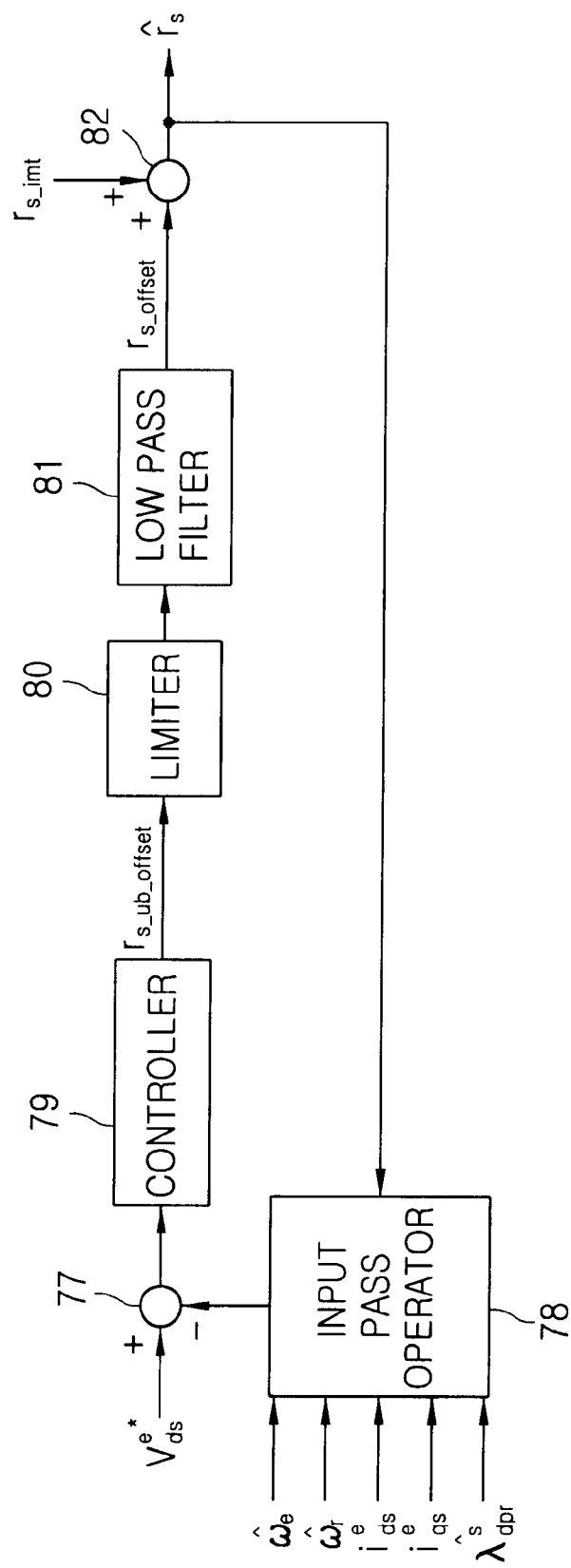
FIG. 6 is a view showing the construction of a primary resistance estimating unit for estimating a primary resistance value of the sensorless vector control system of an induction motor in accordance with the preferred embodiment of the present invention.

FIG. 6 is a view showing the construction of the primary resistance estimating unit for estimating a primary resistance value of the sensorless vector control system of an induction motor in accordance with the preferred embodiment of the present invention.

As shown in FIG. 6, the primary resistance estimating unit for estimating a primary resistance value of the sensorless vector control system includes: a twelfth operator 77 for receiving the d-axis voltage ($v_{ds}^{e*}$) on the synchronous reference frame and the d-axis voltage ($v_{ds}^e$) on the synchronous reference frame of an input voltage operator 78 (to be described), and operating them; a controller 79 for receiving the output value of the twelfth operator 77 and outputting a primary resistance offset value; a limiter for receiving the primary resistance offset value and limiting it to a predetermined value; a low pass filter 81 for receiving the output value of the limiter 80, removing an unnecessary portion and outputting a filtered value ($r_{s\_offset}$); a thirteenth operator 82 for operating the low-pass filtered value and the initial primary resistance value ($r_{s\_int}$) and estimating a primary resistance value ($\hat{r}_s$); and the input voltage operator 78 for receiving the estimated primary resistance value ($\hat{r}_s$), the values ($\hat{\omega}_e, \hat{\omega}_r, \hat{\lambda}_{dr}^e, \hat{\lambda}_{qr}^e$) from the magnetic flux and speed estimating unit and the two phase currents ($i_{ds}^e, e_{qs}^e$) on the synchronous reference frame, and outputting the d-axis voltage ($v_{ds}^e$) on the synchronous reference frame.

The operation of the primary resistance estimating unit for estimating a primary resistance value of a sensorless vector control system of an induction motor constructed as described above will now be explained.

The computed d-axis voltage ($v_{ds}^{e*}$) of the synchronous coordinate system and the output values ($\hat{\omega}_e, \hat{\omega}_r, \hat{\lambda}_{dr}^e, \hat{\lambda}_{qr}^e$) of the magnetic flux and speed estimating unit and the two phase currents ($i_{ds}^e, i_{qs}^e$) on the synchronous coordinate system are received to estimate the primary resistance value ($\hat{r}_s$), and then the primary resistance value 17 of the rotor magnetic flux estimating unit according to the voltage model is controlled while being varied by using the estimated primary resistance value ($\hat{r}_s$), whereby the induction motor can be stably controlled even at a low speed.

That is, the twelfth operator 77 receives the d-axis voltage ($v_{ds}^{e*}$) on the synchronous reference frame and the d-axis voltage ($v_{ds}^e$) of the input voltage operator 78, and operates and outputs them. Then, the controller 79 receives the output value and outputs the primary resistance offset value. The limiter 80 receives the primary resistance offset value and limits it to a predetermined value. The output value of the limiter 80 is received, of which unnecessary portion is removed. The filtered value ($r_{s\_offset}$) is outputted, and the filtered value ($r_{s\_offset}$) and the initial primary resistance value ($r_{s\_int}$) are operated to thereby estimate the primary resistance value ($\hat{r}_s$).

The following equation (10) is used by the input voltage operating unit 78 to obtain the d-axis voltage ($v_{ds}^e$) on the synchronous reference frame.

$$v_{ds}^e = (\hat{r}_s + r_r L_m^2/L_r^2)i_{ds}^e + \sigma L_s p i_{ds}^e - \omega_e \sigma L_s i_{qs}^e - r_r L_m/L_r^2 \hat{\lambda}_{dr}^e - \hat{w}_r L_m/L_r \hat{\lambda}_{qr}^e \quad (10)$$

wherein '$L_m$' indicates a magnetized reactance, '$L_r$' indicates a synchronous reactance, and '$r_r$' indicates a resistance on the synchronization reference frame.

As so far described, the sensorless vector control system of an induction motor in accordance with the present invention has many advantages.

For example, first, since the speed and the torque of the induction motor can be controlled, the vector control system can be adopted even to the application sector which requires a tension control such as paper, metal film or fiber which allows only a vector control as well as the variable speed.

Secondly, a problem caused due to an installation of an additional sensor in an application sector which requires a speed control and a torque control of an induction motor is solved and the precise vector control is accomplished.

Thirdly, since the vector control is available for the every speed range without using the speed sensor, the sensorless vector control apparatus can be made to a product.

Fourthly, since the operation amount for implementing an algorithm is not much, the speed of the induction motor and the torque control can be easily performed with a general CPU or a DSP.

Lastly, since the induction motor is not much dependent on a parameter and the system is operated in a stable range, it can be readily adopted to an industrial site.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A sensorless vector control system of an induction motor in which power is supplied from a power supply unit to drive an induction motor, comprising:

a magnetic flux and speed controlling unit for receiving a predetermined command value and generating two phase voltages of direct current component;

a first coordinate converting unit for converting the two phase voltages of direct current component into three phase voltages of alternate current component;

an inverter for receiving the three phase voltages of alternate current component and driving an induction motor;

a current detecting unit for detecting and outputting three phase currents of alternate current component flowing between the inverter and the induction motor;

a second coordinate converting unit for converting the three phase currents of alternate current component from the current detecting means into two phase currents of direct current component;

a magnetic flux and speed estimating unit for receiving the two phase voltage of DC component from the second coordinate converting unit and estimating values of magnetic flux and speed required for a vector control; and a primary resistance estimating unit for receiving the two phase voltages of direct current component, the two phase currents of direct current component and the magnetic flux and speed estimated values, estimating a primary resistance wherein the magnetic flux and speed controlling means comprises:

a first operator for receiving a reference velocity ($\omega_r^*$) and an estimated velocity ($\hat{\omega}_r$) and arithmetically operating;

a speed controller for receiving the output of the first operator and outputting a reference torque component current ($i_{qs}^{e*}$);

a second operator for receiving the reference torque component current ($i_{qs}^{e*}$) and the torque component current ($i_{qs}^{e}$) on a synchronous reference frame and arithmetically operating;

a torque current controller for receiving the output of the second operator and generating a q-axis voltage ($v_{qs}^{e*}$) on the synchronous reference frame;

a third operator for receiving the reference magnetic flux ($\lambda_{dr}^{e*}$) and the estimated magnetic flux ($\lambda_{dr}^{e}$) of the induction motor, and arithmetically operating;

a magnetic flux controller for receiving the output of the third operator and outputting an magnetic flux component offset current ($i_{ds\_offset}^{e*}$);

a magnetic flux current operator for receiving the reference magnetic flux ($\lambda_{dr}^{e*}$) of the induction motor and outputting a initial magnetic flux component current ($i_{ds\_init}^{e*}$);

a fourth operator for receiving the magnetic flux component offset current ($i_{ds\_init}^{e*}$) and the initial magnetic flux component current ($i_{ds\_init}^{e*}$) and operating them;

a fifth operator for receiving the output value ($i_{ds}^{e*}$) of the fourth operator and the magnetic flux component current ($i_{ds}^{e}$) on the synchronous reference frame; and a magnetic flux current controller for receiving the output of the fifth operator and generating a d-axis voltage ($v_{ds}^{e*}$) on the synchronous reference frame.

2. The system of claim 1, wherein the first coordinate converting unit comprises:

a synchronous to stationary reference frame converter for receiving the two phase voltages ($v_{qs}^{e*}, v_{ds}^{e*}$) of direct current component, converting them into two phase voltages ($v_{qs}^{s*}, v_{ds}^{s*}$) on a stationary reference frame and outputting them; and a 2 phase to 3 phase reference frame converter for converting the two phase voltages ($v_{qs}^{s*}, v_{ds}^{s*}$) on the stationary reference frame into three phase voltages ($v_a^*, v_b^*, v_c^*$) of alternate current component, and outputting them.

3. The system of claim 1, wherein the second frame converting unit comprises:

a 3 phase to 2 phase frame converter for receiving three phase currents ($i_a, i_b, i_c$) of alternate current component, converting them into two phase currents ($i_{qs}^{s}, i_{ds}^{s}$), and outputting them; and a stationary to synchronous reference frame converter 40 for receiving the two phase currents ($i_{qs}^{s}, i_{ds}^{s}$) of DC component, converting them into two phase currents ($i_{ds}^{e}, i_{qs}^{e}$), and outputting them.

4. The system of claim 1, wherein the magnetic flux and speed estimating unit comprises:

a rotor magnetic flux estimator using current model, for outputting a rotor magnetic flux ($\hat{\lambda}_{dqr\_cm}^{s}$) from a current ($i_{dqs}^{s}$) and a voltage ($v_{dqs}^{s*}$) on the stationary reference frame;

a rotor magnetic flux estimator using a voltage model, for outputting a rotor magnetic flux ($\hat{\lambda}_{dqr\_vm}^{s}$) from the current ($i_{dqs}^{s}$) and the voltage ($v_{dqs}^{s*}$) on the stationary reference frame;

a seventh operator for computing a difference value between the output value of the rotor magnetic flux estimator using the voltage model and the output value of the rotor magnetic flux estimator using the current model;

a controller for receiving the output value of the seventh operator, multiplying it by a predetermined proportional constant value, and obtaining a magnetic flux estimated value ($\hat{\lambda}_{dqr}^{s}$); and a magnetic flux and speed operator for receiving the magnetic flux estimated value ($\hat{\lambda}_{dqr}^{s}$) and computing a value required for vector control.

5. The system of claim 4, wherein the rotor magnetic flux estimator according to the current model comprises:

a first reference frame converter for receiving the two phase currents ($i_{dqs}^{s}; i_{ds}^{s}, i_{qs}^{s}$) on the stationary reference frame and converting them into the values on the synchronous reference frame and outputting them;

a sixth operator for outputting a difference between a value obtained by multiplying the output values ($i_{dqs}^{r}; i_{ds}^{r}, i_{qs}^{r}$) of the first reference frame converter by an induction motor constant $$\left(\frac{L_m}{L_r}\right)$$

and a value obtained by multiplying rotor magnetic flux ($\hat{\lambda}_{dqr}^r; \hat{\lambda}_{dr}^r, \hat{\lambda}_{qr}^r$) on the synchronous reference frame by a time constant $$\left(\frac{1}{T_r}\right)$$

defined by the induction motor constant;
- a first integrator for receiving the output value of the sixth operator and outputting a rotor magnetic flux ($\hat{\lambda}_{dqr}^r$) on the synchronous reference frame;
- a second integrator for receiving an estimated velocity ($\hat{\omega}_r$) from a magnetic flux and speed operator and integrating it; and
- a second coordinate converter for receiving the output value ($\hat{\lambda}_{dqr}^r$) of the first integrator and the output value of the second integrator, reference frame converting them, and outputting a rotor magnetic flux ($\hat{\lambda}_{dqr\_cm}^s$) on the stationary reference frame.

6. The system of claim 4, wherein the rotor magnetic flux ($\hat{\lambda}_{dqr}^r$) on the synchronous reference frame in the rotor magnetic flux estimator using the current model is obtained from the equations of $$\frac{d\hat{\lambda}_{dr}^r}{dt} = -\frac{r_r}{L_r}\hat{\lambda}_{dr} + r_r\frac{L_m}{L_r}i_{ds}^r \text{ and } \frac{d\hat{\lambda}_{qr}^r}{dt} = -\frac{r_r}{L_r}\hat{\lambda}_{qr} + r_r\frac{L_m}{L_r}i_{qs}^r,$$

and the rotor magnetic flux on the stationary reference frame is obtained by the following equations of $\hat{\lambda}_{dr}^s = \hat{\lambda}_{dr}^r \cos\theta_r - \hat{\lambda}_{qr}^r \sin\theta_r$ and $\hat{\lambda}_{qr}^s = \hat{\lambda}_{dr}^r \sin\theta_r + \hat{\lambda}_{qr}^r \cos\theta_r$, wherein '$L_r$' indicates a synchronous reactance, '$L_m$' indicates a magnetized reactance, '$r_r$' indicates a resistance of synchronization reference frame, and '$i_{ds}^r$' and '$i_{qs}^r$' indicate current on the synchronous reference frame.

7. The system of claim 4, wherein rotor magnetic flux estimator using the voltage model comprises:
- an eighth operator for operating a value obtained by multiplying the voltage ($v_{dqs}^{s*}$) expressed in the stationary reference frame and the current ($i_{dqs}^s$) expressed in the stationary reference frame by the primary resistance and outputting it;
- a ninth operator for operating the output value of the eight operator and the output value of a controller and outputting it;
- a third integrator for integrating the output value of the ninth operator;
- a tenth operator for operating a difference value between a value obtained by multiplying the current ($i_{dqs}^s$) expressed in a stationary reference frame by a leakage magnetic flux component ($\sigma L_s$) and the output value of the third integrator; and
- an induction motor constant $$\left(\frac{L_m}{L_r}\right).$$

8. The system of claim 7, wherein the rotor magnetic flux ($\hat{\lambda}_{dr}^s, \hat{\lambda}_{qr}^s$) on the stationary reference frame in the rotor magnetic flux estimator according to the voltage model is generated by equations of $$\hat{\lambda}_{ds}^s = \int (V_{ds}^s - r_s i_{ds}^s)dt \text{ and } \hat{\lambda}_{qs}^s = \int (V_{qs}^s - r_s i_{qs}^s)dt,$$

and the rotor magnetic flux ($\hat{\lambda}_{dr}^s, \hat{\lambda}_{qr}^s$) in consideration of the stator leakage magnetic flux component ($\sigma L_s$) in the above equations is generated by equations of $$\hat{\lambda}_{dr}^s = \frac{L_r}{L_m}(\hat{\lambda}_{ds}^s - \sigma L_s i_{ds}^s) \text{ and } \hat{\lambda}_{qr}^s = \frac{L_r}{L_m}(\hat{\lambda}_{qs}^s - \sigma L_s i_{qs}^s),$$

wherein '$V_{ds}^s$' and '$V_{qs}^s$' indicate voltage on the stationary reference frame, '$i_{qs}^s$' and '$i_{ds}^s$' indicate currents on the stationary reference frame, '$r_s$' indicates a primary resistance, '$L_r$' indicates a synchronous reactance, '$L_m$' indicates a magnetized reactance, and '$i_{qs}^s$' and '$i_{ds}^s$' indicate currents on the stationary reference frame.

9. The system of claim 4, wherein the magnetic flux estimated value ($\hat{\lambda}_{dqr}^s$) required for the vector control signifies a magnetic flux estimated by using the rotor magnetic flux ($\hat{\lambda}_{dqr\_cm}^s$) according to the current model and the rotor magnetic flux ($\hat{\lambda}_{dqr\_vm}^s$) according to the voltage model, and the voltage model uses the high pass filter $$\left(\frac{s}{s + K_p}\right)$$

and the current model uses the low pass filter $$\left(\frac{K_p}{s + K_p}\right),$$

to estimate the final rotor magnetic flux.

10. The system of claim 9, wherein the magnetic flux estimated value ($\hat{\lambda}_{dqr}^s$) is obtained by using equation of $$\hat{\lambda}_{dqr}^s = \frac{s}{s + K_p}\hat{\lambda}_{dqr\_vm}^s + \frac{K_p}{s + K_p}\hat{\lambda}_{dqr\_cm}^s.$$

11. The system of claim 4, wherein the magnetic flux and speed operational unit comprises:
- an Arc_tan( ) function for receiving a magnetic flux estimated value ($\hat{\lambda}_{dqr}^s$) and estimating a magnetic flux angle ($\hat{\theta}_e$);
- a differentiator for receiving the estimated magnetic flux angle and estimating a magnetic flux angular velocity ($\hat{\omega}_e$);
- a third coordinate converter for receiving the magnetic flux estimated value ($\hat{\lambda}_{dqr}^s$) and the magnetic flux angle ($\hat{\theta}_e$) and outputting a DC magnetic flux ($\hat{\lambda}_{dqr}^e$) on the synchronous reference frame;
- a slip angular velocity estimating unit for receiving the output value ($\hat{\lambda}_{dqr}^e$) of the third coordinate converter and a current ($i_{qs}^e$) on the synchronous reference frame and estimating a slip angular velocity ($\hat{\omega}_{slip}$); and
- an eleventh operator for operating the output value ($\hat{\omega}_e$) of the differentiator and the estimated slip angular velocity ($\hat{\omega}_{slip}$) and outputting an estimated velocity ($\hat{\omega}_r$).

12. The system of claim 1, wherein the primary resistance estimating unit comprises:
- a twelfth operator for receiving the d-axis voltage ($v_{ds}^{e*}$) on the synchronous coordinate system and the d-axis voltage ($v_{ds}^e$) on the synchronous reference frame of an input voltage operator, and operating them;

a controller for receiving the output value of the twelfth operator and outputting a primary resistance offset value;

a limiter for receiving the primary resistance offset value and limiting it to a predetermined value;

a low pass filter for receiving the output value of the limiter, removing an unnecessary portion and outputting a filtered value ($r_{s\_offset}$);

a thirteenth operator for operating the low-pass filtered value and the initial primary resistance value ($r_{s\_int}$) and estimating a primary resistance value ($\hat{r}_s$); and the input voltage operator for receiving the estimated primary resistance value ($\hat{r}_s$), the values ($\hat{\omega}_e, \hat{\omega}_r, \hat{\lambda}_{dr}^e, \hat{\lambda}_{qr}^e$) from the magnetic flux and speed estimating unit and the two phase currents ($i_{ds}^e, i_{qs}^e$) on the synchronous reference frame, and outputting the d-axis voltage ($v_{ds}^e$) on the synchronous reference frame.

13. The system of claim 12, wherein the d-axis voltage ($v_{ds}^e$) is generated by using equation of $$v_{ds}^e = \left(\hat{r}_s + r_r \frac{L_m^2}{L_r^2}\right) i_{ds}^e + \sigma L_s p i_{ds}^e - \omega_e \sigma L_s i_{qs}^e - r_r \frac{L_m}{L_r^2} \hat{\lambda}_{dr}^e - \hat{w}_r \frac{L_m}{L_r} \hat{\lambda}_{qr}^e,$$

wherein '$L_m$' indicates a magnetized reactance, '$L_r$' indicates a synchronous reactance, and '$r_r$' indicates a resistance on the synchronization reference frame.

14. A sensorless vector control method of an induction motor in which power is supplied from a power supply unit to drive an induction motor, comprising the steps of:

receiving a predetermined command value and generating two phase voltages of DC component;

converting the two phase voltages of DC component into three phase voltages to drive an induction motor;

detecting three phase power of AC component flowing at the induction motor when the induction motor is driven and outputting three phase currents of AC component;

converting the three phase currents of AC component into two phase currents of DC component;

receiving the voltages and currents of DC components and outputting a magnetic flux and speed estimated value by using an algorithm required for vector control by a magnetic flux and speed estimated values; and receiving the voltages and currents of DC component and the magnetic flux and speed estimated values and estimating a primary resistance by a primary resistance estimator, wherein in estimating the magnetic flux and speed, a rotor magnetic flux according to a current model and a rotor magnetic flux according to a voltage model are estimated by using the current and voltage expressed in the stationary reference frame, a difference value between the estimated values of the voltage model and the current model, and the outputted difference value is multiplied by a constant value of a controller to obtain a magnetic flux estimated value, wherein the rotor magnetic flux estimation according to the current model is used at a low speed range along with a low pass filter in order to prevent generation of a magnetic flux estimation error caused due to an induction motor constant variation.

15. The method of claim 14, wherein the rotor magnetic flux estimation according to the current model and the rotor magnetic flux estimation according to the voltage model use an integral function and a differential function, so that the instantaneous torque, the strong point of the vector control, can be controlled.

16. The method of claim 14, wherein the value of the controller is a constant value proportional to the induction motor speed, so that it can be easily determined in the velocity range.

17. The method of claim 14, wherein the resistance value of the magnetic flux and speed estimating unit is controlled while being varied by using the estimated value of the primary resistance estimating unit, so that a stable operation can be performed even at a low speed.

18. The method of claim 14, wherein, in the magnetic flux and speed estimation, the motor constant variation and voltage error are automatically compensated at a low speed range.

19. The method of claim 14, wherein the operation for implementing an algorithm is performed by using a central processing unit (CPU) or a digital signal processor (DSP).

20. A sensorless vector control system of an induction motor in which power is supplied from a power supply unit to drive an induction motor, comprising:

a magnetic flux and speed controlling unit for receiving a predetermined command value and generating two phase voltages of direct current component;

a first coordinate converting unit for converting the two phase voltages of direct current component into three phase voltages of alternate current component;

an inverter for receiving the three phase voltages of alternate current component and driving an induction motor;

a current detecting unit for detecting and outputting three phase currents of alternate current component flowing between the inverter and the induction motor;

a second coordinate converting unit for converting the three phase currents of alternate current component from the current detecting means into two phase currents of direct current component;

a magnetic flux and speed estimating unit for receiving the two phase voltage of DC component from the second coordinate converting unit, and estimating values of magnetic flux and speed required for a vector control; and a primary resistance estimating unit for receiving the two phase voltages of direct current component, the two phase currents of direct current component and the magnetic flux and speed estimated values, estimating a primary resistance, wherein the magnetic flux and speed estimating unit comprises:

a rotor magnetic flux estimator using current model, for outputting a rotor magnetic flux ($\hat{\lambda}_{dqr\_cm}^s$) from a current ($i_{dqs}^s$) and a voltage ($v_{dqs}^{s*}$) on the stationary reference frame;

a rotor magnetic flux estimator using a voltage model, for outputting a rotor magnetic flux ($\hat{\lambda}_{dqr\_vm}^s$) from the current ($i_{dqs}^s$) and the voltage ($v_{dqs}^{s*}$) on the stationary reference frame;

a seventh operator for computing a difference value between the output value of the rotor magnetic flux estimator using the voltage model and the output value of the rotor magnetic flux estimator using the current model;

a controller for receiving the output value of the seventh operator, multiplying it by a predetermined proportional constant value, and obtaining a magnetic flux estimated value ($\hat{\lambda}_{dqr}{}^s$); and a magnetic flux and speed operator for receiving the magnetic flux estimated value ($\hat{\lambda}_{dqr}{}^s$) and computing a value required for vector control, wherein the rotor magnetic flux ($\hat{\lambda}_{dqr}{}^r$) on the synchronous reference frame in the rotor magnetic flux estimator using the current model is obtained from the equations of $$\frac{d\hat{\lambda}_{dr}^r}{dt} = -\frac{r_r}{L_r}\hat{\lambda}_{dr} + r_r\frac{L_m}{L_r}i_{ds}^r \text{ and } \frac{d\hat{\lambda}_{qr}^r}{dt} = -\frac{r_r}{L_r}\hat{\lambda}_{qr} + r_r\frac{L_m}{L_r}i_{qs}^r,$$

and the rotor magnetic flux on the stationary reference frame is obtained by the following equations of $\hat{\lambda}_{dr}{}^s=\hat{\lambda}_{dr}{}^r \cos\theta_r - \hat{\lambda}_{qr}{}^r \sin\theta_r$ and $\hat{\lambda}_{qr}{}^s=\hat{\lambda}_{dr}{}^r \sin\theta_r + \hat{\lambda}_{qr}{}^r \cos\theta_r$, wherein '$L_r$' indicates a synchronous reactance, '$L_m$' indicates a magnetized reactance, '$r_r$' indicates a resistance of synchronization reference frame, and '$i_{ds}{}^r$' and '$i_{qs}{}^r$' indicate current on the synchronous reference frame.

21. A sensorless vector control system of an induction motor in which power is supplied from a power supply unit to drive an induction motor, comprising:

a magnetic flux and speed controlling unit for receiving a predetermined command value and generating two phase voltages of direct current component;

a first coordinate converting unit for converting the two phase voltages of direct current component into three phase voltages of alternate current component;

an inverter for receiving the three phase voltages of alternate current component and driving an induction motor;

a current detecting unit for detecting and outputting three phase currents of alternate current component flowing between the inverter and the induction motor;

a second coordinate converting unit for converting the three phase currents of alternate current component from the current detecting means into two phase currents of direct current component;

a magnetic flux and speed estimating unit for receiving the two phase voltage of DC component from the second coordinate converting unit, and estimating values of magnetic flux and speed required for a vector control; and a primary resistance estimating unit for receiving the two phase voltages of direct current component, the two phase currents of direct current component and the magnetic flux and speed estimated values, estimating a primary resistance, wherein the magnetic flux and speed estimating unit comprises:

a rotor magnetic flux estimator using current model, for outputting a rotor magnetic flux ($\hat{\lambda}_{dqr\_cm}{}^s$) from a current ($i_{dqs}{}^s$) and a voltage ($v_{dqs}{}^{s*}$) on the stationary reference frame;

a rotor magnetic flux estimator using a voltage model, for outputting a rotor magnetic flux ($\hat{\lambda}_{dqr\_vm}{}^s$) from the current ($i_{dqs}{}^s$) and the voltage ($v_{dqs}{}^s$) on the stationary reference frame;

a seventh operator for computing a difference value between the output value of the rotor magnetic flux estimator using the voltage model and the output value of the rotor magnetic flux estimator using the current model;

a controller for receiving the output value of the seventh operator, multiplying it by a predetermined proportional constant value, and obtaining a magnetic flux estimated value ($\hat{\lambda}_{dqr}{}^s$); and a magnetic flux and speed operator for receiving the magnetic flux estimated value ($\hat{\lambda}_{dqr}{}^s$) and computing a value required for vector control, wherein the rotor magnetic flux ($\hat{\lambda}_{dr}{}^s, \hat{\lambda}_{qr}{}^s$) on the stationary reference frame in the rotor magnetic flux estimator according to the voltage model is generated by equations of $$\hat{\lambda}_{ds}^s = \int (V_{ds}^s - r_s i_{ds}^s)dt \text{ and } \hat{\lambda}_{qs}^s = \int (V_{qs}^s - r_s i_{qs}^s)dt,$$

and the rotor magnetic flux ($\hat{\lambda}_{dr}{}^s, \hat{\lambda}_{qr}{}^s$) in consideration of the stator leakage magnetic flux component ($\sigma L_s$) in the above equations is generated by equations of $$\hat{\lambda}_{dr}^s = \frac{L_r}{L_m}(\hat{\lambda}_{ds}^s - \sigma L_s i_{ds}^s) \text{ and } \hat{\lambda}_{qr}^s = \frac{L_r}{L_m}(\hat{\lambda}_{qs}^s - \sigma L_s i_{qs}^s),$$

wherein '$V_{ds}{}^s$' and '$V_{qs}{}^s$' indicate voltage on the stationary reference frame, '$i_{qs}{}^s$' and '$i_{ds}{}^s$' indicate currents on the stationary reference frame, '$r_s$' indicates a primary resistance, '$L_r$' indicates a synchronous reactance, '$L_m$' indicates a magnetized reactance, and '$i_{qs}{}^s$' and '$i_{ds}{}^s$' indicate currents on the stationary reference frame.

22. A sensorless vector control method of an induction motor in which power is supplied from a power supply unit to drive an induction motor, comprising the steps of:

receiving a predetermined command value and generating two phase voltages of DC component;

converting the two phase voltages of DC component into three phase voltages to drive an induction motor;

detecting three phase power of AC component flowing at the induction motor when the induction motor is driven and outputting three phase currents of AC component;

converting the three phase currents of AC component into two phase currents of DC component;

receiving the voltages and currents of DC components and outputting a magnetic flux and speed estimated value by using an algorithm required for vector control by a magnetic flux and speed estimated values; and receiving the voltages and currents of DC component and the magnetic flux and speed estimated values and estimating a primary resistance by a primary resistance estimator, wherein in estimating the magnetic flux and speed, a rotor magnetic flux according to a current model and a rotor magnetic flux according to a voltage model are estimated by using the current and voltage expressed in the stationary reference frame, a difference value between the estimated values of the voltage model and the current model, and the outputted difference value is multiplied by a constant value of a controller to obtain a magnetic flux estimated value, wherein the rotor magnetic flux estimation according to the voltage model is used in a high speed range together with a high pass filter in order to remove problems such as a variation offset, an integrator saturation, a stator impedance drop at a low speed and a magnetic estimation error due to a noise.

* * * * *